Aug. 27, 1968  R. M. HAHN  3,398,774
TREE HARVESTER
Filed June 2, 1966  4 Sheets-Sheet 1

INVENTOR.
RAYMOND M. HAHN
BY
Schroeder, Siegfried
& Ryan   ATTORNEYS

Aug. 27, 1968

R. M. HAHN 3,398,774

TREE HARVESTER

Filed June 2, 1966

INVENTOR.
RAYMOND M. HAHN

BY Schroeder, Siegfried
& Ryan
ATTORNEYS

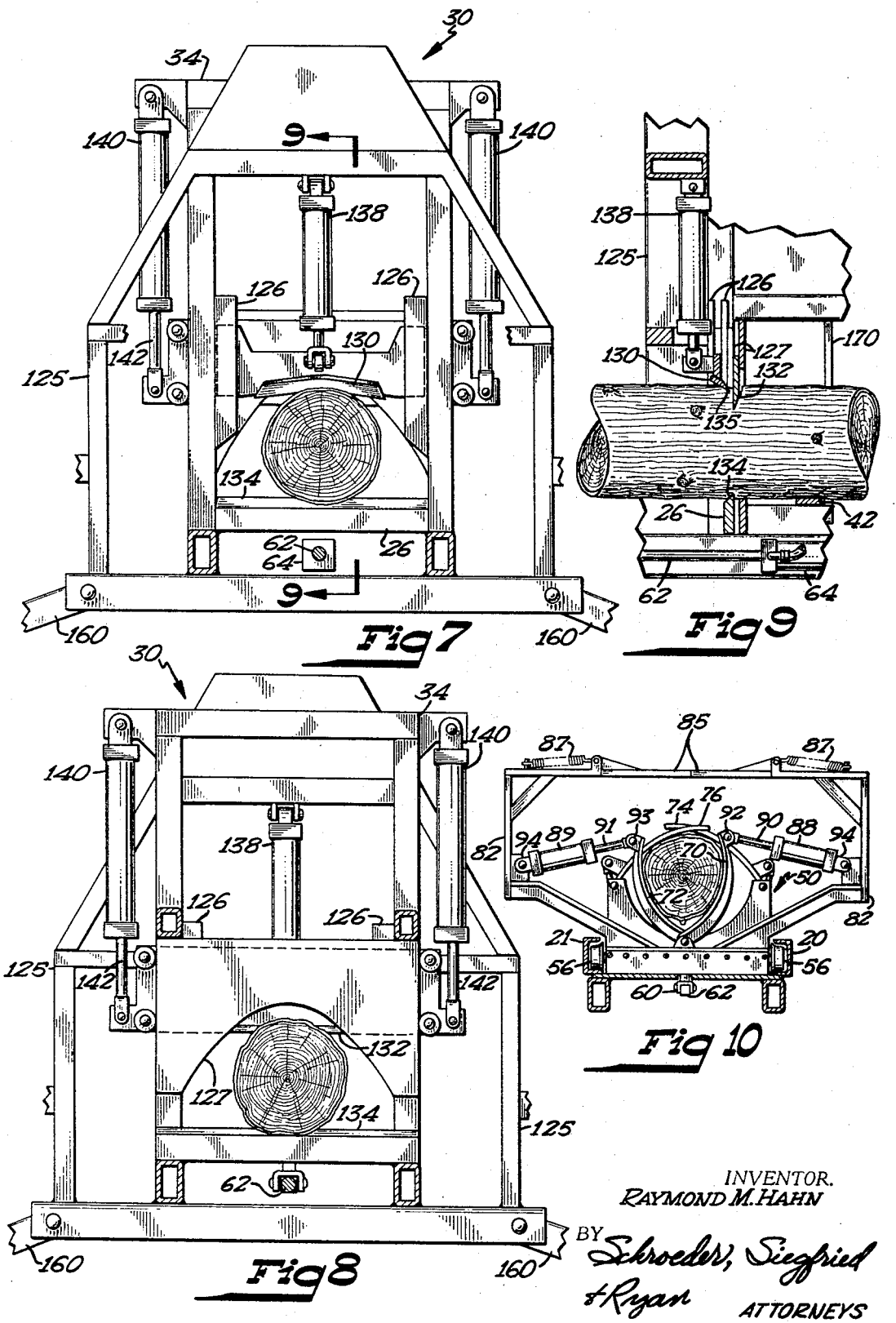

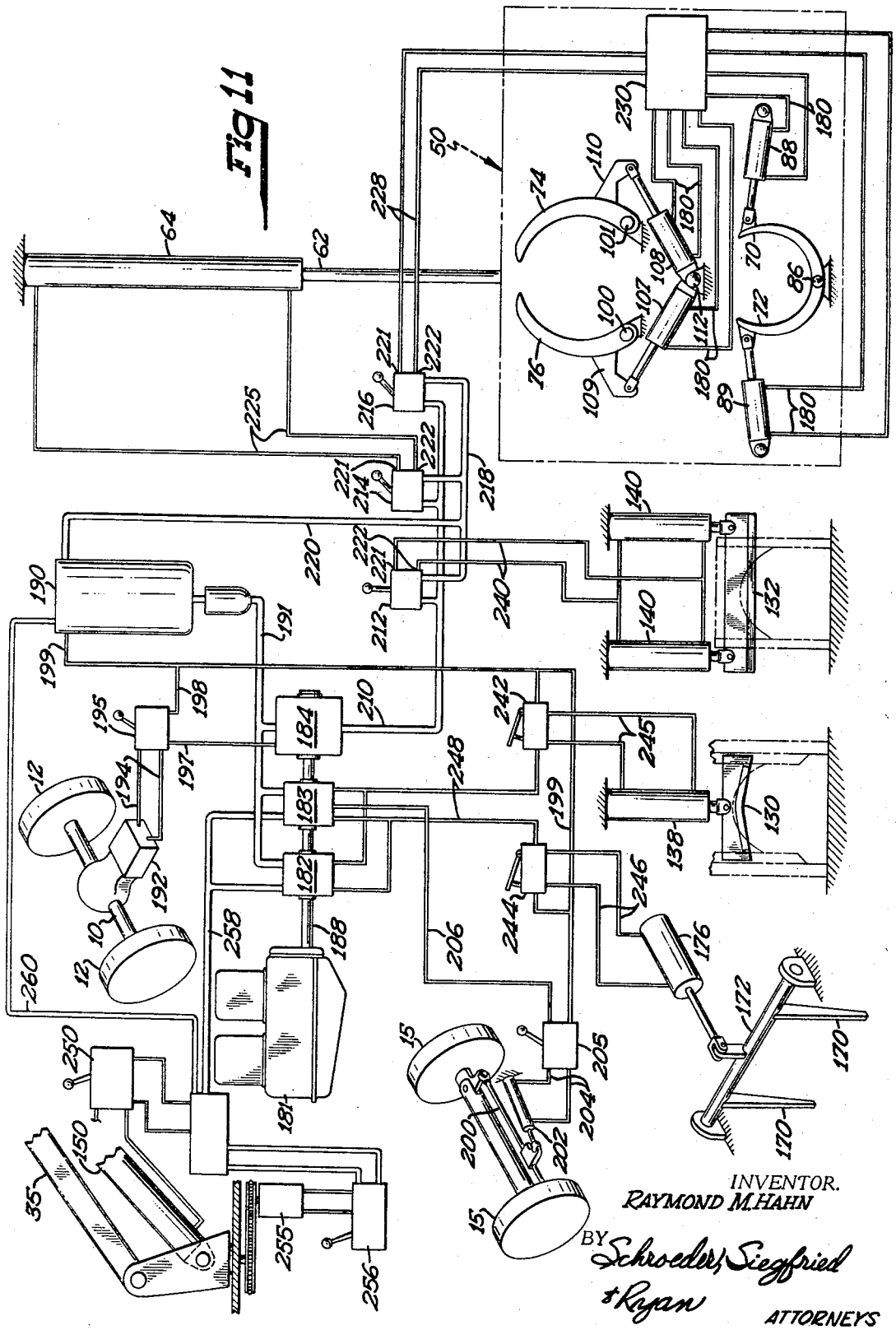

United States Patent Office 3,398,774
Patented Aug. 27, 1968

3,398,774
TREE HARVESTER
Raymond M. Hahn, Schroeder, Minn. 55613
Filed June 2, 1966, Ser. No. 554,890
28 Claims. (Cl. 144—309)

ABSTRACT OF THE DISCLOSURE

A tree harvester comprising a supporting framework with a horizontal bed having a dolly mounted thereon for reciprocating movement over the extent of the same. The dolly mounts two pairs of curved plates which are pivotally mounted on the dolly and which selectively open to receive a tree trunk and close to grip a tree trunk for the purpose of moving a tree trunk on the dolly over the bed with movement of the dolly in one direction and to debranch the tree trunk with movement of the dolly in the opposite direction after the tree trunk has been gripped by a gripping means on the framework. The gripping means has associated therewith a tree trunk severing means and the framework includes a structure for ejecting the severed logs from the supporting framework.

---

Figure 1:
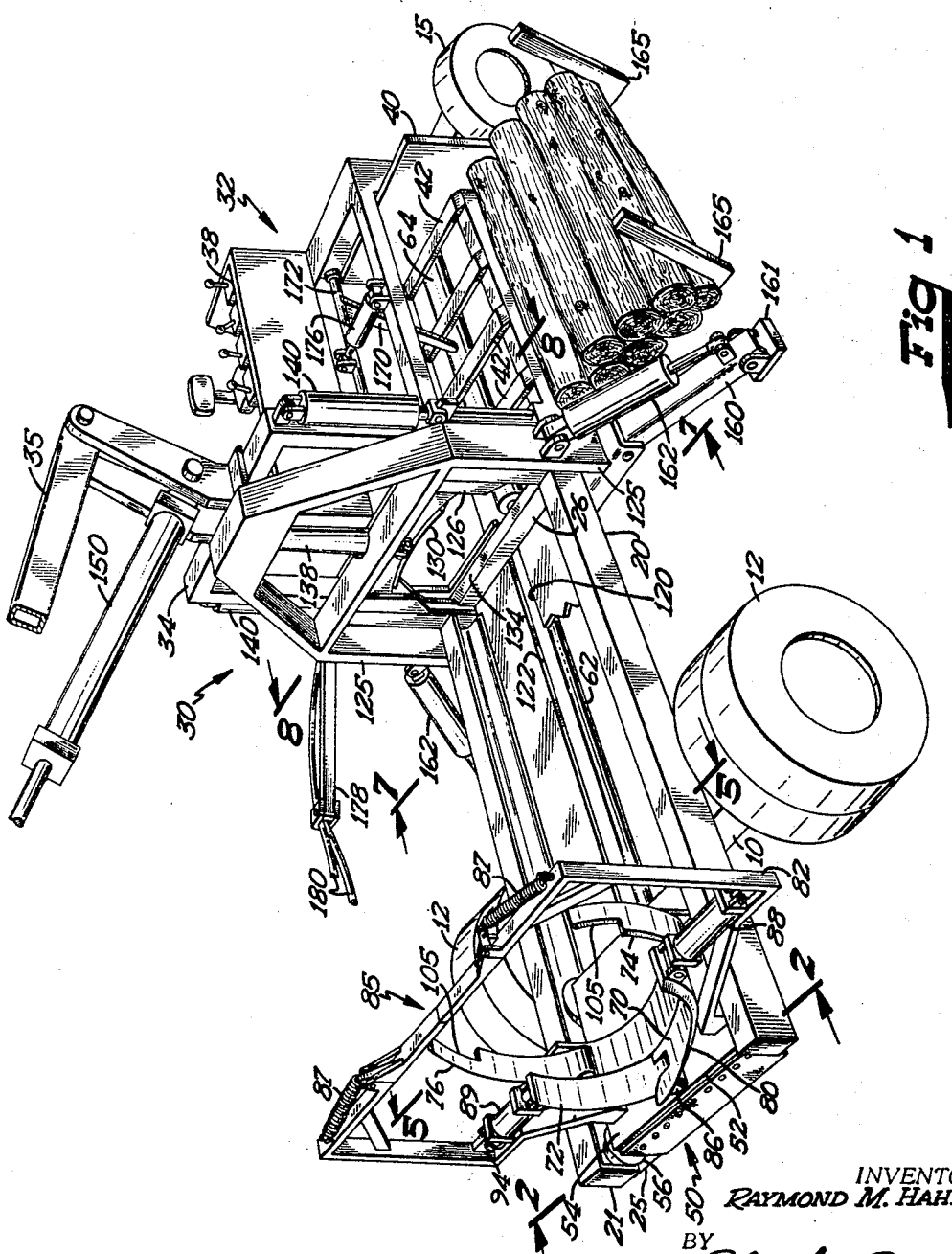

This invention relates to mobile tree harvesting apparatus and more particularly to an improved equipment for processing severed trees to remove branches from the same and cut the trunks of the trees into predetermined log lengths.

Apparatus of this general type is known and in use. In the past it has taken varied forms and has been adpated to perform all or part of the tree harvesting function. However, complexity of the prior structures together with the degree of mobility of the same have generally limited their application. The structures which are adapted to sever or cut trees as well as delimb the same and cut them into logs are generally of such physical size as to prohibit widespread usage in tree harvesting applications. Others require considerable auxiliary equipment and manual labor to facilitate moving of a severed tree onto the harvesting machine.

In the present invention, an improved tree harvesting machine of the highly mobile type is provided which facilitates its use in and on sites where trees are to be severed eliminating much of the manual labor and auxiliary equipment required. The improved tree harvesting apparatus further simplifies the harvesting operation and greatly speeds up the same as to increase output over structures currently available. This improved tree harvesting machine is adapted to take severed trees from the sites where they are felled, and lift, through a suitable boom, the tree trunk onto the tree harvesting machine wherein the tree is moved into a predetermined position on the machine and held as a section of the same is delimbed. Thereafter the trunk is moved to a predetermined position where a desired log length is cut and an additional portion of the tree trunk is delimbed. This sequence is repeated until the complete tree has been delimbed and cut into desired log lengths with each log being removed from the machine and positioned aside the same for ready stacking and storage. The improved tree harvesting machine is easy to use and extremely simplified for maintenance purposes. It will also harvset varying sized trees or tree trunks.

Therefore it is the principle object of this invention to provide an improved tree harvesting apparatus.

Another object of this invention is to provide in a tree harvesting apparatus a single composite machine which is capable of handling severed trees, removing branches from the same and severing the same into log lengths, while removing the logs from the machine for stacking purposes.

Another object of this invention is to provide an improvde tree harvesting apparatus which is highly mobile and may be readily used on logging sites for handling of severed trees and cutting the same into logs.

A still further object of this invention is to provide for a simplified and improved tree harvesting apparatus which eliminates annual handling of the trees after cutting and the requirement of separate apparatus for the same.

A still further object of this invention is to provide apparatus of this type which is easy to use and maintain.

Figure 2:
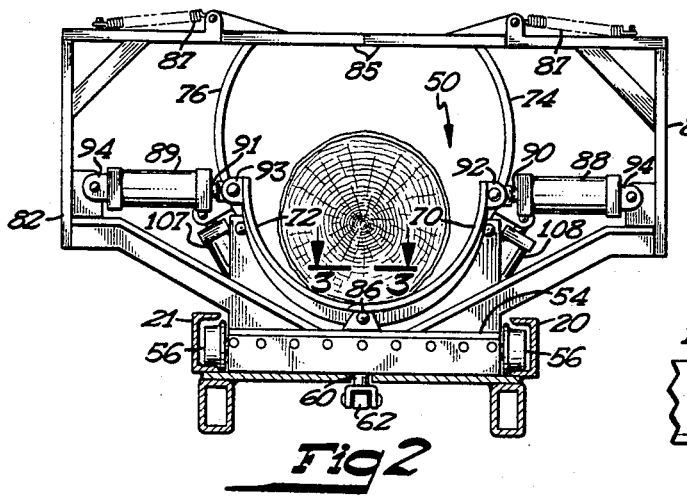
Figure 4:
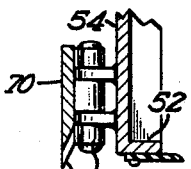
Figure 3:
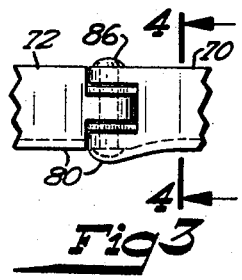
Figure 5:
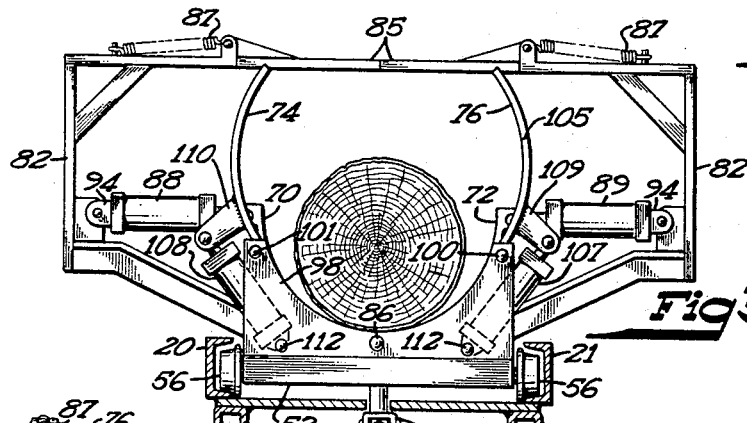
Figure 6:
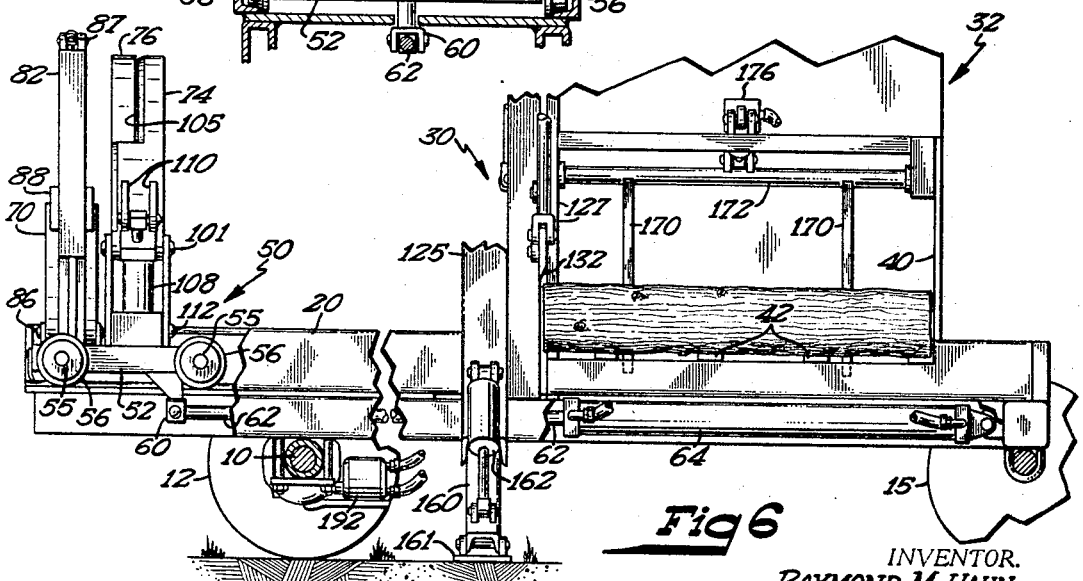

These and other objects of this invention will become apparent from a reading of the attached description together with the drawings wherein:

FIGURE 1 is a perspective view of the improved tree harvesting machine,

FIGURE 2 is a sectional view of the tree harvesting machine of FIGURE 1 taken along the lines 2—2 therein and with parts removed, FIGURE 3 is a sectional view of a portion of the tree harvesting machine shown in FIGURE 2 taken along the lines 3—3 therein, FIGURE 4 is a sectional view of a portion of the tree harvesting machine taken along the lines 4—4 in FIGURE 3, FIGURE 5 is a sectional view of a tree harvesting machine taken along the lines 5—5 in FIGURE 1 and with parts removed, FIGURE 6 is a sectional view of the tree harvesting machine in side elevation and with parts removed, FIGURE 7 is a sectional view of the tree harvesting machine taken along the lines 7—7 in FIGURE 1, FIGURE 8 is a sectional view of the tree harvesting machine taken along the lines 8—8 in FIGURE 1, FIGURE 9 is a sectional view of a portion of the tree harvesting machine taken along the lines 9—9 in FIGURE 7, FIGURE 10 is a sectional view of the tree harvesting machine similar to FIGURE 2 with the stripping plates in a gripping position, and FIGURE 11 is a schematic control diagram of the working parts of the improved tree harvesting machine.

The improved tree harvesting machine is shown in perspective in FIGURE 1 as a mobile unit having a generally flatbed and working parts adapted to move the trunk of a severed tree onto the bed, advance it onto the machine, strip limbs over a given section thereof, sever a predetermined section of the trunk and eject the severed log, repeating the process as the tree is delimbed and cut into predetermined lengths. Thus as will be seen in FIGURE 1, the tree harvesting machine includes basically a chassis of a conventional type (not shown) on which is mounted a rear axle 10 with rear wheels 12 thereon and steerable front wheels 15. Positioned on the chassis is a bed or framework formed primarily of a pair of elongated beams 20 and 21, which are C-shaped in cross-section, and suitable cross supports 25, 26 separating and spacing the same. The rear wheels 12 of the chassis are adapted to be driven through a suitable motive source 192 (see FIGURE 6) and the front wheels include suitable steering together with motive means for the same, these being conventional and shown in FIGURE 11. The bed positioned on the chassis is suitably attached thereto, and intermediate the extent of the same is an upstanding frame, indicated generally at 30, which is secured to the elongated beams and cross members. Extending over the forward or front portion of the machine is a suitable raised housing 32 and support structure 34 for a boom 35 which is mounted for elevational movement and rotation in a conventional manner. Also included on the support structure 34 is a suitable control panel 38 and an access surface (not shown) at which an operator will be positioned for operation of the machine. Beneath this support structure and at the forward end of the machine is a stop plate 40 and an injection area defined by transversely extending guides 42 on which the severed logs rest after cutting and from which they are ejected from the machine.

The horizontal bed portion over the back half of the machine defines a guide structure or support for a dolly 50 comprised of a rectangular frame 52 with a top plate 54 and a pair of axles suitably supported therein, as indicated at 55, with wheels 56 at the extremities of the same which wheels are positioned in the C-shaped frame parts 20, 21 to be guided therein along the extent of the bed. On the underside of the frame structure 52 is positioned a downwardly projecting flange which has connected thereto the shaft 62 of an elongated hydraulic actuator 64 adapted to move the dolly back and forth along the bed and in the guides defined by the beams 20, 21 from the end of the machine to the middle of the same adjacent the upstanding frame 30.

The dolly 50 mounts a plurality of curved plate members as indicated at 70, 72 and 74, 76 respectively. These curved plate members are pivotally mounted on the dolly, as will be hereinafter defined, and are adapted to be moved relative to the dolly such as to encircle or enclose the trunk of a tree to grasp the same and move it with the dolly along the bed of the machine as the dolly is moved toward the upstanding frame 30. In a second mode of operation for the curved plates, the plates are released slightly from the trunk of a tree so as to slide thereon and the rearward edge of the plates each have a knife like edge, such as is indicated at 80, thereon which engage branches from the trunk of the tree and sever the same therefrom in a stripping operation. As will be seen in the sectional views 2 and 5, dolly 50 mounts an upstanding frame 82 which is suitably secured to the base frame 52 and generally encircles or encloses the stripping plates. At the top side of the upstanding frame portion of the dolly, as indicated at 85, portions of the same are pivoted to provide for opening of this frame to permit the entrance of a tree trunk. These pivoted portions 85 are spring biased through spring 87 to normally be in a closed position. The stripping plates 70, 72 are pivotally mounted at one extremity on a flange 86 affixed to the top plate of the dolly with the plates being so curved along their extent as to provide in the open position a generally semicircular configuration. The free extremities of the plates 70, 72 are connected to actuators 88, 89 respectively which may be of the air or hydraulic type. The actuators have shafts 90, 91 respectively which pivotally connect to flanges 92, 93 at the ends of the stripping plates 70, 72. The opposite extremities of the actuators 88, 89 are connected through clevis type mountings 94 to the sides of the frame portion 82 of the dolly. Energization of the actuators 88, 89 will cause the respective shafts 90, 91 to move outwardly from the actuator pivoting the stripping plates 70, 72 about the pivot flange 86, (see FIGURE 10) to decrease the spacing between the plates with respect to a log therein for the purpose of gripping the same or stripping branches therefrom. The sectional views 3 and 4 show the extremities of the plates 70, 72 at the pivot 86 with a suitable cutting surface 80 on the rearward edge of the same and a portion protecting the hinge during the stripping operation. The cross-sectional view in FIGURE 4 shows a knife surface on the stripping plates.

The sectional view of FIGURE 5 shows the plates 74, 76 and their mounting. As will be seen in FIGURE 5, the plates 74, 76 are mounted on an upstanding flange or plate 98 suitably secured to the upper surface 54 of the dolly through means, not shown, the plate 98 having a semicircular recess therein of the same shape as defined by the stripping plates 70, 72 in the relaxed or retracted position. The upper extremities of the plate 98, as at 100, 101, contain pivots by means of which the stripping plates 74, 76 are mounted. The plates 74, 76 have notches 105 at the extremities of the same which permit the plates to be brought together to reduce the physical opening between the same whenever it is desired to clamp a smaller diameter log or tree trunk.

In addition, plates 74, 76 are connected through actuators 107, 108 respectively at the shaft extremities of the same and through flanges 109, 110 on the plates 74, 76 such that the actuators when distended will pivot the plates 74, 76 relative to their respective pivots to close the plates upon one another. The extremities of the actuators 107, 108 are pivotally connected to the dolly, as indicated at 112. The plates 70, 72 and 74, 76 are each adapted to be separately pivoted through their respective actuators, and connected at one extremity to the dolly and at the other extremity to the respective plates so that the plates may define a generally circular opening of varying diameter depending upon the degree of extension of the respective actuators. As will be hereinafter noted, the respective actuators are of the fluid type and are adapted to be controlled by four-way valves such that they may variably position the respective plates on their pivot structures and hold the same thereon. In this manner, the actuators may be operated until the respective plates engage and encircle the tree trunk for the purpose of solidly gripping the same to advance the trunk on the bed of the tree harvesting machine for the purpose of starting the harvesting operation. Whenever the tree runk is held by a gripping means, to be later defined, the stripping plates are loosened with respect to the trunk so that they may freely slide thereon as the dolly is moved with the opposite direction and the stripping plates at their rearward surface, as the dolly is advanced in this direction, will sever limbs from the trunk of the tree in a stripping operation.

As will be best seen in the side sectional view in FIGURE 6, the dolly will be advanced in its guided path in the beams 20, 21 toward and away from the central upstanding frame 30. The elongated shaft 62 of the actuator 64 limits the movement of the dolly over this range. In addition, the bed includes protective cover plates 120 over the portion of the bed between the beams 20, 21 and over the actuators 62, 64 with a suitable slot portion 122 therein to permit movement of the flange 60 on the bottom of the dolly therein.

The central upstanding frame section 30 and suitable side flanges 125 having two pairs of channels 126 and 127 therein mount cutting and gripper plates 130, 132 respectively for vertical movement toward and away from the general extent of the bed. On the cross beam 26 at this point, a suitable knife edge surface 134 is positioned which cooperates with the gripper plate to hold a log or trunk of a tree at this point. The gripper plate has a tilted edge 135 to bite into the surface of the log and prevent rearward movement in the stripping operation. A suitable hydraulic actuator 138 is connected between the upstanding frame 30 and the gripper plate permits reciprocating vertical movement of the gripper plate relative to the bed of the machine and the gripping surface 134 to engage a log surface and bite into the same for the purpose of securing the end of the tree therein. The reciprocated knife 132 is a blade of the guillotine type and has a straight edge across the same being operated through actuators 140 whose shafts 142 are connected to the plate to reciprocate the same. The force moving the plate is of such extent that it will shear directly through the extent of the trunk of a tree for the purpose of severing logs therefrom.

Beyond the upstanding frame 30 is the ejecting bed portion of the machine mounting the translational skid bars 42 and the stop member 40 at the end of the same. Positioned above this structure is the supporting structure 32 for the boom 35 together with its azimuth gearing (not shown) and suitable controls. The boom is of a conventional type and may take varying forms having its own actuators, such as indicated at 150.

In addition, the entire bed of the tree harvesting machine is stabilized by pivoted flanges 160 connected to the upstanding frame portion 125, the flanges having feet 161 adapted to engage and bite into the surface of the earth or ground to support the entire structure of the tree harvesting machine from tilting or overturning whenever the boom is picking up severed trees and moving the trunks of the same into position on the dolly at the end of the bed. Suitable actuators 162 position the stabilizing flanges 160 in connection with the ground and this structure when retracted pivots up to be out of the way whenever the machine is moved.

Further, the ejection portion of the machine includes ejecting arms 170 mounted on a pivoted shaft 172 positioned on the supporting structure 32 and over the forward portion of the bed. A suitable actuator 176 operates through a flange to pivot the shaft 172 and hence the arms 170 thereon to eject or move several logs on the supporting skids 42 to a catch rack 165 which is removably positioned beside the machine during operation. In addition, a flexible pivoted arm 178 positioned on the upstanding frame carries flexible tube connections 180 extending to the hydraulic actuators associated with the clamping mechanism or stripping mechanism on the dolly. This permits the flexible hoses to be out of the way during the moving and severing or stripping operation and permits movement of the dolly back and forth with respect to the bed.

In the operation of the improved tree harvesting machine, the respective actuators are manually operated in a predetermined sequence to move the trunk of a tree onto the end of the bed with the dolly 50 located therein. The actuators controlling the stripping blades are retracted and the tree trunk is positioned so that it can be gripped by the sets of stripping plates 70, 72 and 74, 76 to encircle the trunk near the severed extremity of the tree. As the actuators operating or pivoting the stripping plates are energized, they are securely clamped around the end of the tree or trunk of the tree to secure the same therebetween. Thereafter the actuator 64 is energized to advance the dolly toward the upstanding frame portion. At this time the trunk of the tree has the limbs thereon and the entire tree will be moved along the surface of the bed until the trunk of the tree projects beyond the gripping plate and severing blade 130, 132 respectively. At this time, the gripping plate is actuated to bite into the surface of the tree trunk and the actuators operaing the stripping plates are moved to a position where the plates are loosely fitted around the surface of the tree trunk. At this time the dolly is advanced toward the back end of the bed and the surfaces of the stripping plates engage the projecting limbs from the trunk stripping the same therefrom while the trunk is being held by the gripping plate at the upstanding frame portion in the center of the machine.

The control circuit for providing this operation is best seen in FIGURE 11. It shows schematically a drive engine 181 of the internal combustion type driving a plurality of pumps 182, 183 and 184 mounted on a common shaft 188. The fluid medium used herein is of the hydraulic type, but it will be recognized that other mediums may be employed for operating the fluid actuators. Associated with the pumps is a reservoir 190 which provides the return portion of the hydraulic circuit with a suitable feed line 191 leading therefrom to the pumps 182–184 respectively. The improved tree harvesting machine is shown as portable and the rear drive wheels 12 on the axle 10 have associated therewith a fluid motor 192 of the reversible type being fed through fluid control lines 194 and controlled by a valve 195. The valve 195 is of a four-way type providing reversible flow paths therebetween from an inlet conduit 197 leading to the pump 184 and a return conduit 198 leading to a common conduit 199 and the reservoir 190. The front or steering portion of the tree harvesting machine operates through a suitable steering linkage 200 which is connected to the wheels 15 and is operated by a reversible fluid actuator 202 energized through fluid control lines 204 from a valve 205. Valve 205 receives fluid from an inlet conduit 206 leading to the pump 183 and is connected to return line 199 and the reservoir. Valve 205 is also of the conventional four-way type and like valve 195 and the valves to be hereinafter identified is shown in block form for simplicity. The various actuators associated with the working elements of the tree harvesting machine are all supplied respectively from one or the other of the pumps 182, 183 and 184 and are controlled by suitable four-way valves which provide for reversible flow to the bidirectional actuators associated therewith and return lines to the reservoir. Thus as will be seen in FIGURE 11, the pump 184 has an output line 210 leading to inlet conduits for valves 212, 214 and 216 respectively. The valves also have a common return conduit 218 leading to a common return pipe 220 and the reservoir 190. Each of the respective valves 212, 214 and 216 have respectively outlet ports 221 and 222 through which fluid flows selectively in a predetermined direction depending upon the valve position. Thus the valve 214 controls flow through the lines 225 connected to the extremities of the actuator 64 to control the direction of movement of the dolly 50 in the forward and reverse direction for advancing a tree trunk onto the bed of the harvesting machine and urging the knifes or stripping plates in the opposite direction as the tree trunk is held for the stripping operation. Similarly the valve 216 includes output conduits or lines 228 connected respectively to the directional ports 221, 222 of this valve and a common manifold 230 from which flexible connections lead to the respective actuators 107, 108 and 88, 89 for the stripping plates 74, 76 and 70, 72 respectively. Since all of the flexible conduits 180 are basically parallel connections with the conduits 228, they will supply flow to the respective ends of the actuators to simultaneously reverse or move the same in reversible directions in a conventional manner. Thus the plates 70, 72 are brought closer together or further apart depending upon the direction of the control handle 16 with simultaneous and similar movement of the plates 74, 76. Thus the plates through the operation of the valve 216 will be closed on the log for the purpose of gripping the same and advancing it on the dolly toward the cutting knife and gripping plates or may be loosened to an intermediate position where the plates will slide on the surface of the log but encircle the same closely to the trunk for the stripping operation. Further in the retracted position, the plates are spread far apart to provide a generally semicircular opening so that a tree trunk may be readily dropped into the same. The valve actuator 212 through outlet lines 240 controls the actuators 140 connected to the edges of the cutting plate 130 for the purpose of severing the tree trunk in the process of cutting logs to predetermined lengths. In addition, four-way valves 242 and 244 respectively operated through foot operated controls have outlet lines 245 and 246 respectively which energize the actuators 138 and 176 for the purpose of gripping a log prior to the cutting and stripping operation and during the cutting operation and ejecting a log after it has been severed from the tree trunk. The valves 242 and 244, are controllably energized through input lines 248 leading to pumps 182, 183 in parallel with return lines from the valves 242, 244 being connected to the common conduit 199 leading to the reservoir. The boom 35 is positioned in elevation through actuator 150 energized from pumps 182, 193 and controlled by a valve 250. Similarly an azimuth motor 255 for the boom is controlled by a valve 256 from the same pump with supply 258 and return 260 conduits connecting the pumps and reservoir with the control valves and actuators.

The sequence of operation of the tree harvesting machine is determined manually through operation of an operator standing at the control console 38. In this sequence of operation, the operator will first pick up a severed tree with a boom 35 and advance it onto the end of the tree harvesting machine and in position between the stripping plates 70, 72 and 74 and 76 respectively. Thereafter the valve 216 will be operated to tightly grip the tree trunk and with the valve in this position and the plates securely holding the trunk, the valve 214 will be operated to advance the dolly toward the cutting and gripping knives. A sufficient portion of the tree trunk will project beyond the stripping plates so as to be engaged by the gripping plate 132 which is moved when the tree trunk is in position so that the tree trunk is gripped between the plate and the gripping surface 134. This force applied to the gripping plate will bite into the surface of the log and securely holding the same and thereafter the valve 216 will be operated to loosen the stripping plates on the trunk of the tree and the valve 214 will be operated to reverse the direction of movement of the dolly. This will cause stripping of the limbs from the tree trunk and the dolly will be advanced to the end of the tree harvesting machine where the valve 216 will again be operated to a position where the stripping blades tightly clamp the tree trunk for the purpose of advancing the trunk on the bed. With the trunk so secured, the gripping surface of the knife is released and the trunk is advanced to the stop plate 40. At this time the gripping surface or plate 132 is again operated to bite into the log surface and the clamping or stripping plates 70, 72 and 74, 76 are loosened on the surface of the log. Simultaneous with this the valve 212 is operated to sever the tree trunk and define a predetermined length of log. With this operation, the stripping function or operation may take place by return of the dolly to its normal position. At the same time, the foot operated control 244 may be operated to remove the severed log through energization of the actuator 176 and pivoting of the arms 170. With this improved tree harvesting machine, severed trees may be taken from the cutting site or felled location through operation of the boom and grappling means associated therewith to move severed trees at the severed portion of the trunk to the tree harvesting machine wherein an operator may readily strip and cut the tree trunk into predetermined log lengths with the logs being ejected from the machine and stacked in a receiving frame 165 at the side of the same. This improved tree harvesting machine greatly simplifies the tree harvesting operation and is highly mobile so that it may be located on site to eliminate any need for use of auxiliary equipment and manual labor. It is further easy to use and maintain.

It will be appreciated that although the drawings and disclosure illustrate and describe a guillotine type of shear for severing the logs, it is within the scope of this invention and the appended claims to use other cutting means such as a slidable knife or saw of various types.

In considering this invention it should be remembered that the present disclosure is intended to be illustratively only and the scope of the invention should be determined by the appended claims.

I claim:

1. A tree harvesting machine comprising, a supporting mobile framework, said supporting mobile framework having a guide bed extending partially over the extent of the same, a dolly mounted on the guide bed for reciprocated movement over the extent of the same, a first pair of stripping plates pivotally mounted at one point on the dolly, a second pair of curved stripping plates each pivotally mounted on the dolly at points remote from the first point and remote from one another, said pair of stripping plates when moved to one position defining an open curved surface and when moved to an opposite pivoted position being adapted to encircle and grip a tree trunk, an upstanding frame mounted on the mobile framework adjacent the end of the guide bed and intermediate the extent of the framework, cutting means mounted in said upstanding framework for reciprocating motion toward and away from the guide bed and adapted to cut tree trunks thereon, gripping means adjustably mounted on the upstanding frame and spaced from the cutting means in the direction of the guide bed, stop means positioned on the mobile framework at the extremity remote from the guide bed and being adapted to stop movement of logs on the mobile framework through movement of the dolly to define a predetermined length to be severed by the cutting means, means connected to and operating the dolly with the stripping plates thereon to move logs on the framework toward said cutting means and said stop means with said stripping plates being adapted to remove limbs from the logs as the curved plates are reciprocated, and means positioned on the framework adjacent the stop means for removing logs therefrom.

2. The tree harvesting machine of claim 1 in which the cutter means is a platlike knife member slidably mounted in the upstanding frame and adapted to sever tree trunks with movement toward the guide bed.

3. The tree harvesting machine of claim 2 in which the gripping means is a clamping plate slidably mounted in the upstanding frame adjacent the slidable cutting plate and reciprocated independently thereof to engage a surface of a log and secure the same in the upstanding frame.

4. The tree harvesting machine of claim 3 in which the first pair of stripping plates are mounted on a common journal positioned on the dolly such that the curved stripping plates curve toward one another and in which the second pair of curved stripping plates are mounted on separate journals positioned at the edges of the dolly and above the first named journal.

5. The tree harvesting machine of claim 4 in which the guide bed extends substantially over half the length of the mobile framework and provides a log receiving bed at the opposite extremity of the framework beyond the upstanding frame over which the removing means is positioned.

6. The tree harvesting machine of claim 5 and including separate means connected to and operating the dolly and the stripping plates thereon, the cutting means and the gripping means together with the means for removing the logs from the framework so that the tree harvester may receive and grip a log, advance the end of the log to the stop means, hold the log in position through the gripping means as the stripping arms move with the dolly to remove branches from the tree trunk, advance the stripped log against the stop means, sever a predetermined length of the same and repeat the process in a stepped sequence.

7. The tree harvesting machine of claim 6 in which the separate means include separate motors and manually operated controls individually operating the motors.

8. The tree harvesting machine of claim 6 in which the means removing the logs from the framework are a pair of pivoted arms operated through separate motive means to engage the severed logs and remove them from the log receiving bed.

9. The tree harvesting machine of claim 8 and including a boom and grappling hooks with operative means mounted on the upstanding frame and adapted to move tree trunks onto the dolly.

10. The tree harvesting machine of claim 9 and including pivoted flange means positioned on the dolly above the pivoted stripping arms to permit entrance of tree trunks therein.

11. A tree harvesting machine comprising, a supporting mobile frame having an elongated horizontal bed, a plurality of curved stripping plates, means mounting the stripping plates on the mobile frame for translational movement over a portion of the elongated bed, said stripping plates being pivotally mounted on the mounting means so as to move from a collective opened position to a closed position in which said plurality of curved plates form collectively a generally circular pattern selectively adapted to tightly grip and loosely fit around and slide on a tree trunk to move the tree trunk in one direction and strip branches from the same with movement in the opposite direction, an upstanding frame positioned on the mobile frame intermediate along the extent of the elongated horizontal bed, cutter means mounted in the upstanding frame and adapted to be reciprocated toward and away from the horizontal bed to cut tree trunks thereon, gripping means mounted on the upstanding frame and adapted to move toward and away from the horizontal bed to grip a tree trunk and secure the same to the upstanding frame during stripping of branches from a tree trunk, and log ejecting means positioned on the supporting mobile frame and remote from the plurality of stripping plates being adapted to eject logs from the frame after severing the same from the trunks of a tree.

12. The tree harvesting machine of claim 11 and including means for selectively operating the stripping means in both pivotal movement and translational movement together with operation of the gripping means, cutting means and ejecting means.

13. The tree harvesting machine of claim 12 in which the cutting means is a reciprocating plate type knife slidably mounted on the upstanding frame and adapted to be moved toward and away from the bed to sever tree trunks thereon.

14. The tree harvesting machine of claim 13 in which the gripping means is a second slidable plate with a securing surface thereon adapted to bite into the surface of a log and be reciprocated vertically on the upstanding frame to engage and hold a tree trunk thereon.

15. The tree harvesting machine of claim 14 in which the plurality of stripping plates are four in number each having a knife edged surface at one side thereof adapted to engage branches on a tree trunk and shear the same therefrom as the stripping plates are moved in a predetermined direction.

16. The tree harvesting machine of claim 15 in which the means operating the stripping plates, cutter means and gripper means together with log ejecting means are separate hydraulic motors each operated from individual control valves connected to a hydraulic source and permitting operation in a sequence in which the stripping plates first engage and grip a tree trunk to move the same along the elongated horizontal bed, followed by operation of the gripping means to secure the end of a log on the horizontal bed as the stripping plates are released from girpping contact with the trunk to be loosely positioned thereon and moved in an opposite direction to strip branches from the tree trunk, after which the stripping plates engage the trunk and advance the same beyond the cutting means a predetermined distance and against the stop means so that the cutting means may be operated to sever a log therefrom and the ejector means operated sequentially to eject the severed log from the mobile frame.

17. The tree harvesting machine of claim 16 in which the ejector means has a pair of arms pivotally operated to engage a log on the horizontal bed and move the same translationally of the extent of the bed from the mobile frame.

18. The tree harvesting machine of claim 17 in which at least a pair of the stripping plates have notched extremities to permit encircling varying sized tree trunks.

19. A tree harvesting machine comprising, a supporting mobile framework, said supporting mobile framework having a guide bed extending partially over the extent of the same, a dolly mounted on the guide bed for reciprocated movement over the extent of the same, a first pair of stripping plates pivotally mounted at one point on the dolly, a second pair of curved stripping plates each pivotally mounted on the dolly at points remote from the first point and remote from one another, said pair of stripping plates when moved to one position defining an open curved surface and when moved to an opposite pivoted position being adapted to encircle and grip a tree trunk, an upstanding frame mounted on the mobile framework adjacent the end of the guide bed and intermediately extent of the framework, gripping means adjustably mounted on the upstanding frame and movable toward and away from the guide bed, means connected to and operating the dolly with the stripping plates thereon to move logs on the framework toward said gripping means with said stripping plates being adapted to remove limbs from the logs as the curved plates are reciprocated, and means positioned on the framework for removing logs therefrom.

20. A tree harvesting machine comprising, a supporting mobile frame having an elongated horizontal bed, a plurality of curved stripping plates, means mounting the stripping plates on the mobile frame for translational movement over a portion of the elongated bed, said stripping plates being pivotally mounted on the mounting means so as to move from a collective opened position to a closed position in which said plurality of curved plates form collectively a generally circular pattern selectively adapted to tightly grip and loosely fit around and slide on a tree trunk to move the tree trunk in one direction and strip branches from the same with movement in the opposite direction, an upstanding frame positioned on the mobile frame intermediate along the extent of the elongated horizontal bed, gripping means mounted on the upstanding frame and adapted to move toward and away from the horizontal bed to grip a tree trunk and secure the same to the upstanding frame during stripping of branches from a tree trunk, and log ejecting means positioned on the supporting mobile frame and remote from the plurality of stripping plates being adapted to eject logs from the frame.

21. A debrancher comprising: a supporting framework, said supporting framework having a guide bed extending partially over the extent of the same, a dolly mounted on the guide bed for reciprocated movement over the extent of the same, a first pair of curved plates pivotally mounted at one point on the dolly, a second pair of curved plates each pivotally mounted on the dolly at points remote from the first point and remote from one another, said pair of plates when moved to one position defining an open curved surface and when moved to an opposite pivoted position being adapted to encircle and grip a tree trunk, means connected to and operating the dolly with the plates thereon in a closed position to encircle and grip a tree trunk to move a log on the framework, means for gripping said log to maintain it at said moved position, and means connected to and operating said dolly with the plates thereon in said one position to remove limbs from said log as said dolly is moved back to its first position.

22. The debrancher of claim 21 and including means positioned on the supporting framework adapted to receive and process logs moved thereon whenever said dolly is at rest.

23. The debrancher of claim 22 in which the processing means is a knife slasher adapted to sever logs moved on the dolly.

24. A slasher comprising, a supporting framework, said framework having a guide bed extending partially over the extent of the same, means for feeding logs intermittently along the extent of the guide bed, gripping means for clamping said log after each said intermittent movement, and cutting means mounted for reciprocating motion toward and away from the guide bed adapted to cut tree trunks thereon, said cutter means being a platelike knife member slidably mounted in an upstanding frame positioned on the supporting framework adjacent one end of said guide bed and said gripping means being a clamping plate also slidably mounted in the upstanding frame on the supporting framework adjacent the slidable platelike knife member and reciprocated independently thereof to engage the surface of the log and secure the same.

25. The slasher of claim 24 including means for removing logs from the supporting framework comprising at least one pivoted arm pivotally mounted on the supporting frame work and operated through separate motive means to engage the severed logs and to remove them from the supporting framework.

26. The method of harvesting trees which includes gripping the trunk of felled trees and moving the trees longitudinally on a platform in a horizontal position and in a predetermined direction, holding the tree trunk at a predetermined point and severing branches from the trunk progressively in the opposite direction to that of movement of the tree trunk from the predetermined point, and thereafter repeating the step of gripping the tree trunk adjacent the predetermined point and then moving it on the platform in the predetermined direction followed by successive severing of the branches from the tree trunk by repeating the previous steps of holding and severing.

27. The method of harvesting trees of claim 26 and including the step of severing a portion of the debranched tree trunk beyond the predetermined point of holding intermediate the steps of severing of the branches therefrom and moving of the tree trunk.

28. The method of harvesting trees which includes gripping of the trunk of a felled tree and moving the trunk longitudinally on a platform in a horizontal position and in a predetermined direction through a gripping means, holding the trunk at a predetermined point through a holding means and severing the branches from the trunk progressively in a direction opposite to that of movement of the tree trunk through movement of the gripping means in the opposite direction from the predetermined point of holding, and thereafter repeating the step of gripping the trunk adjacent the predetermined point with the progressing means and moving it on the platform longiutdinally in the predetermined direction followed by successive severing of the branches from the tree trunk by repeating the previous steps of holding of the tree trunk through the holding means and severing the branches with the gripping means.

References Cited
UNITED STATES PATENTS

| | | | |
|---|---|---|---|
| 3,140,736 | 7/1964 | Propst | 144—34 |
| 3,029,848 | 4/1962 | Bombardier | 144—2 XR |
| 3,039,344 | 6/1962 | Hercik | 83—282 XR |
| 3,059,677 | 10/1962 | Busch et al. | 144—2 XR |
| 3,329,184 | 7/1967 | Longert | 144—2 XR |

WILLIAM W. DYER, Jr., *Primary Examiner.*

W. D. BRAY, *Assistant Examiner.*